US012310281B2

(12) United States Patent
Luebben et al.

(10) Patent No.: US 12,310,281 B2
(45) Date of Patent: May 27, 2025

(54) DISTRIBUTION DEVICE FOR GRANULAR MATERIAL

(71) Applicant: Amazonen-werke H. Dreyer SE & Co. KG, Hasbergen (DE)

(72) Inventors: Jan-Eike Luebben, Edewecht (DE); Thomas Wien, Stuhr (DE); Jan Flucke, Hude (DE)

(73) Assignee: Amazonen-Werke H. Dreyer SE & Co. KG, Hasbergen (DE)

( * ) Notice: Subject to any disclaimer, the term of this patent is extended or adjusted under 35 U.S.C. 154(b) by 833 days.

(21) Appl. No.: 17/441,603

(22) PCT Filed: Feb. 6, 2020

(86) PCT No.: PCT/EP2020/052935
§ 371 (c)(1),
(2) Date: Sep. 21, 2021

(87) PCT Pub. No.: WO2020/192990
PCT Pub. Date: Oct. 1, 2020

(65) Prior Publication Data

US 2022/0159903 A1 May 26, 2022

(30) Foreign Application Priority Data

Mar. 26, 2019 (DE) ..................... 10 2019 107 642.0

(51) Int. Cl.
*A01C 7/08* (2006.01)
*A01C 5/06* (2006.01)

(52) U.S. Cl.
CPC .............. *A01C 7/084* (2013.01); *A01C 5/064* (2013.01); *A01C 7/082* (2013.01)

(58) Field of Classification Search
CPC .......... A01C 7/082; A01C 7/084; A01C 5/064
See application file for complete search history.

(56) References Cited

U.S. PATENT DOCUMENTS 5,996,516 A * 12/1999 Benneweis et al. ... A01C 7/081 111/176
9,439,344 B2 9/2016 Connors et al.
(Continued)

FOREIGN PATENT DOCUMENTS

DE 102010015913 A1 9/2011
WO 2011003078 A1 1/2011

OTHER PUBLICATIONS

English Translation of Ukrainian Office Action for Ukrainian Application No. 2021 05790 dated Nov. 17, 2023.
(Continued)

*Primary Examiner* — Tara Mayo
(74) *Attorney, Agent, or Firm* — Potomac Law Group, PLLC; John J. Penny, Jr.

(57) ABSTRACT

A distribution device for granular material having: a distributor housing which has a material inlet opening for the granular material; at least one conveying air duct, situated in the distributor housing, for a material-free conveying air flow, the conveying air duct being connected within the distributor housing to a grain-holding region within which the granular material entering the distributor housing via the material inlet opening can be introduced into the material-free conveying air flow; one or more material flow lines, which adjoin the grain-holding region, for the conveying air flow laden with granular material; and at least one additional air duct, which is situated in the distributor housing for a material-free additional air flow, which can be introduced into the one or more material flow lines via at least one additional air inlet.

11 Claims, 10 Drawing Sheets

(56) References Cited

U.S. PATENT DOCUMENTS

2006/0042529 A1   3/2006   Johnson et al.
2014/0193211 A1   7/2014   Connors et al.

OTHER PUBLICATIONS

International Search Report and Written Opinion, PCT/EP2020/052935, dated May 14, 2020, 18 pages.

* cited by examiner

DISTRIBUTION DEVICE FOR GRANULAR MATERIAL

REFERENCE TO RELATED APPLICATIONS

This application is a 35 U.S.C. 371 national stage filing of International Application No. PCT/EP2020/052935, filed on Feb. 6, 2020, which claims priority to German Application DE 10 2019 107 642.0, filed on Mar. 26, 2019, the contents of which are hereby incorporated by reference.

The invention relates to a distribution device for granular material and to a seed drill.

Seed drills for spreading seed on an agricultural area usually comprise a storage container for the seed, wherein the storage container is connected to a distribution device. Via the distribution device and, if necessary, intermediate supply units, the seed is provided to a plurality of grain singling devices of the seed drill, wherein the seeds singled by the grain singling devices are then deposited on the agricultural area via a plurality of seed drill coulters.

Generic distribution devices usually have a distributor housing, wherein the distributor housing has a material inlet opening for the seed to be distributed. The seed is fed inside the distributor housing to a grain-holding region, within which the seed entering the distributor housing via the material inlet opening is introduced into several conveying air flows. The conveying air flows laden with the seed are then guided out of the distributor housing of the distribution device via several material flow lines so that the conveying air flows laden with the seed can each be provided to an intermediate unit or directly to a singling device of the seed drill.

The distribution devices known in the prior art only allow extremely limited control of the seed flows leaving the distribution device. To date, the conveying air flows have been adjusted to adapt the seed flows leaving the distribution device. This is done, for example, by controlling the power supply of a blower unit that is responsible for generating the conveying air flows.

In practice, it has been shown that in such systems, there is an increased risk of seed deposit within the distribution device. In special sowing situations, this can even lead to clogging of individual duct or line regions within the distributor housing. Corresponding seed deposits thus lead to an inadequate seed supply, which can significantly impair the sowing result. In particular, there may be missing or even interrupted seed rows on the agricultural area.

Thus, the underlying problem of the invention is to avoid material deposits in the lines and ducts of the distribution device and, at the same time, to allow precise control of the material flows leaving the distribution device.

The problem is solved by a distribution device of the type mentioned introductorily, wherein an additional air duct for a material-free additional air flow is arranged in the distributor housing of the distribution device according to the invention, which additional air flow can be introduced via at least one additional air inlet into the one or more material flow lines.

The invention exploits the finding that by means of the additional air flow, the one or more material flow lines can be supplied with additional air, thereby increasing the flow velocity within the one or more material flow lines and accelerating the granular material within the one or more material flow lines. In this way, deposition of the granular material or even clogging of the one or more material flow lines is avoided. By means of the additional air flow, the one or more material flow lines can also be kept free of residues adhering to the granular material.

The additional air flow of the distribution device according to the invention is configured separately from the conveying air flow so that the material-free additional air flow and the material-free conveying air flow represent separate air flows. The distribution device preferably functions as a distribution lock between a storage container for the granular material and a plurality of grain singling devices for the granular material, wherein the grain singling devices provide singled grains of the granular material to downstream seed drill coulters, via which the individual grains are then placed on the agricultural area.

In a preferred embodiment of the distribution device according to the invention, the distributor housing has at least one main air inlet opening, via which an air flow can be introduced into the distributor housing, wherein a flow-dividing device is preferably arranged inside the distributor housing, which is adapted to divide the air flow introduced into the distributor housing into the conveying air flow and the additional air flow. The conveying air flow and the additional air flow can thus be generated by the same blower. Due to the division of the air flow introduced into the distributor housing into the conveying air flow and the additional air flow, an adjustment of the air flow introduced into the distributor housing, for example by changing the power provided to the blower, affects both the conveying air flow and the additional air flow. The volumetric flow rates of the conveying air flow and the additional air flow also depend on the flow resistance along the flow path of the conveying air flow and along the flow path of the additional air flow. For example, if an accumulation of granular material occurs in the grain-holding region, the flow resistance along the flow path of the conveying air flow increases. Due to the increased flow resistance, there is an increase in the volume flow of the additional air flow. Furthermore, an increased flow resistance within the at least one additional air duct leads to an increase in the volumetric flow rate of the conveying air flow. In order to equalize the flow conditions, it may be useful to provide more than one main air inlet opening, for example on both sides of the distributor housing.

In a further development of the distribution device according to the invention, a flow control device is arranged in the at least one conveying air duct, by means of which the conveying air flow can be adjusted. By means of the flow control device in the at least one conveying air duct, the conveying air flow can be adjusted independently of the additional air flow. By means of the flow control device in the at least one conveying air duct, for example, the free flow cross section in a region of the at least one conveying air duct can be changed. In this way, the flow resistance along the flow path of the conveying air flow can be changed. The flow control device in the at least one conveying air duct may comprise a flap mechanism having one or more pivotable air metering flaps. By changing the rotational angle position of the one or more air metering flaps, the conveying air flow can be adjusted. The one or more air metering flaps may be connected to a flap shaft, wherein the rotational angle position of the one or more air metering flaps is adjustable by rotating the flap shaft. Alternatively or additionally, the flow control device may comprise a slide mechanism in the at least one conveying air duct, which has one or more air metering slides that can be moved continuously or stepwise. By changing the position of the one or more air metering slides, flow slots can be partially or completely covered or concealed so that the conveying air flow can thereby be adjusted.

In another preferred embodiment of the distribution device according to the invention, a flow control device is arranged in the at least one additional air duct and/or at the at least one additional air inlet, by means of which the additional air flow can be adjusted. By means of the flow control device in the at least one additional air duct and/or at the at least one additional air inlet, the additional air flow can be adjusted independently of the conveying air flow. By means of the flow control device in the at least one additional air duct and/or at the at least one additional air inlet, for example, the free flow cross section in a region of the at least one additional air duct and/or at the at least one additional air inlet can be changed. In this way, the flow resistance along the flow path of the additional air flow can be changed. The flow control device in the at least one additional air duct and/or at the at least one additional air inlet can comprise a slide mechanism, which has one or more air metering slides that can be moved continuously or stepwise. By changing the position of the one or more air metering slides, flow slots can be partially or completely covered or concealed so that the additional air flow can thereby be adjusted. Alternatively or additionally, in the at least one additional air duct and/or at the at least one additional air inlet, the flow control device may comprise a flap mechanism having one or more pivotable air metering flaps. By changing the rotational angle position of the one or more air metering flaps, the additional air flow can be adjusted. The one or more air metering flaps may be connected to a flap shaft, wherein the rotational angle position of the one or more air metering flaps is adjustable by rotating the flap shaft.

If in the at least one conveying air duct and in the at least one additional air duct and/or at the at least one additional air inlet one flow control device each is arranged, for example only one of the ducts can be enabled. Alternatively, both ducts may be enabled so that the flows mutually support each other. Due to the fact that the conveying air flow and the additional air flow interact with each other through the common air inlet opening and/or via the at least one additional air inlet, the conveying air flow in the conveying air duct and thus also the grain-holding region can be influenced by controlling the additional air flow in the additional air duct. For example, the conveying air flow may be interrupted when the flow control device of the additional air duct is fully opened so that the air flow introduced into the one or more material flow ducts is formed by the additional air flow due to the reduced flow resistance along the additional air flow path. Increased flow resistance along the conveying air flow path may result, for example, from granular material in the grain-holding region. Conversely, the amount of granular material taken up can be increased in a direct manner by weakening the additional air flow, since the conveying air flow within the conveying air duct and thus also in the grain-holding region is thereby increased.

Furthermore, a distribution device according to the invention is preferred, in which the one or more material flow lines comprise one or more main conveying lines, wherein the grain-holding region is preferably arranged in a lower region of the distributor housing and the one or more main conveying lines each extend upright in the distributor housing and are each adapted to convey a conveying air flow laden with granular material upwardly from the grain-holding region. The material flow lines may comprise two separate main conveying lines and/or ones that are spaced apart from each other. Alternatively, in a main conveying line, also a separating device can be arranged, which is adapted to generate two separate flows within the one main conveying line. The separating device can extend up to the material-holding region so that two separate flows are formed within the main conveying line in the direction of flow directly downstream of the material-holding region. Alternatively, the separating device does not extend up to the grain-holding region so that a main flow initially is formed in the direction of flow directly downstream of the grain-holding region, which is then divided into two separate flows within the main conveying line by the separating device. Due to two separate main conveying lines and/or ones that are spaced apart from each other and/or two separate flows within a main conveying line, it is avoided that the material flows negatively influence each other, for example, if one of the material flows is forcibly stopped. For example, a material flow can be forcibly stopped by closing a main conveying line or a part of a main conveying line or a downstream line section by means of a flap. A corresponding closure can be carried out in practice, for example, if the seed drill configuration requires a lower number of material flows than the distribution device can provide as a maximum.

In another preferred embodiment of the distribution device according to the invention, at least one additional air inlet for introducing the additional air flow is located at the one main conveying line or at each of the plurality of main conveying lines. Thus, an additional air flow is introduced into the conveying air flow laden with granular material as it ascends within the distributor housing. Preferably, the one or more main conveying lines each have at least two opposing additional air inlets so that flow turbulence is substantially avoided during introduction of the additional air.

Moreover, a distribution device according to the invention is preferred, in which the one or more material flow lines comprise one or more material transport lines, by means of which the conveying air flow laden with the granular material or the conveying air flows laden with granular material can be guided out of the distributor housing. Preferably, the one or more material transport lines connect to the one or more main conveying lines. Preferably, two material transport lines connect to one or two main conveying lines.

In another preferred embodiment of the distribution device according to the invention, the one or more material transport lines each have a quick-release fastener by means of which a material transport tube can be connected to the respective material transport line, in particular without tools. The quick-release fastener can be configured, for example, as a bayonet fastener. The quick-release fastener can also be a clip and/or clamp fastener. Furthermore, the quick-release fastener can also be configured as a twist-lock fastener.

In another preferred embodiment of the distribution device according to the invention, the distribution device has a plurality of distribution modules arranged side by side, wherein the distribution device can be modularly expanded via further distribution modules. The distribution device is thus scalable depending on the system size. A distribution module can, for example, be configured from two mirror-image module halves. In particular, the distribution modules each have a mirror-symmetrical outer contour so that the respective distribution modules can be used in two different alignments. The alignment of a distribution module can be used to determine the position of the material flow outlets. Depending on the alignment of the individual distribution modules, the material flow outlets can be arranged on a first side of the distribution device or on a second opposite side of the distribution device. Thus, with appropriate alignment of the distribution device, for example, some material flow outlets may be aligned toward the left half of the machine and some material flow outlets may be aligned toward the right half of the machine.

Furthermore, a distribution device according to the invention is preferred, in which each distribution module comprises at least one conveying air duct connected to a grain-holding region, one or more material flow ducts adjoining the grain-holding region, and at least one section of the additional air duct, which is connected to the one or more material flow ducts via at least one additional air inlet. Via the number of distribution modules used, the number of conveying air flows laden with granular material provided by the distribution device in operation can thus be adjusted.

Moreover, a distribution device according to the invention is preferred, in which the distribution modules are inserted into a housing frame and can preferably be removed from the housing frame without being destroyed. The individual distribution modules and the housing frame together form an almost fluid-tight unit. For expanding the distribution device, one or more additional distribution modules can be inserted into the housing frame. For reducing the size of the distribution device, one or more distribution modules can be removed from the housing frame.

The problem underlying the invention is further solved by a seed drill of the type mentioned introductorily, wherein the distribution device of the seed drill according to the invention is configured according to one of the embodiments described above. With regard to the advantages and modifications of the seed drill according to the invention, reference is initially made to the advantages and modifications of the distribution device according to the invention.

The grain singling devices of the seed drill can be pneumatic or mechanical grain singling devices. The pneumatic grain singling devices are adapted to pneumatically separate grains from the granular material provided by the supply unit. The mechanical grain singling devices are adapted to mechanically separate grains from the granular material provided by the supply unit.

In the following, preferred embodiments of the invention are explained and described in more detail with reference to the accompanying drawings. Therein:

Figure 1:
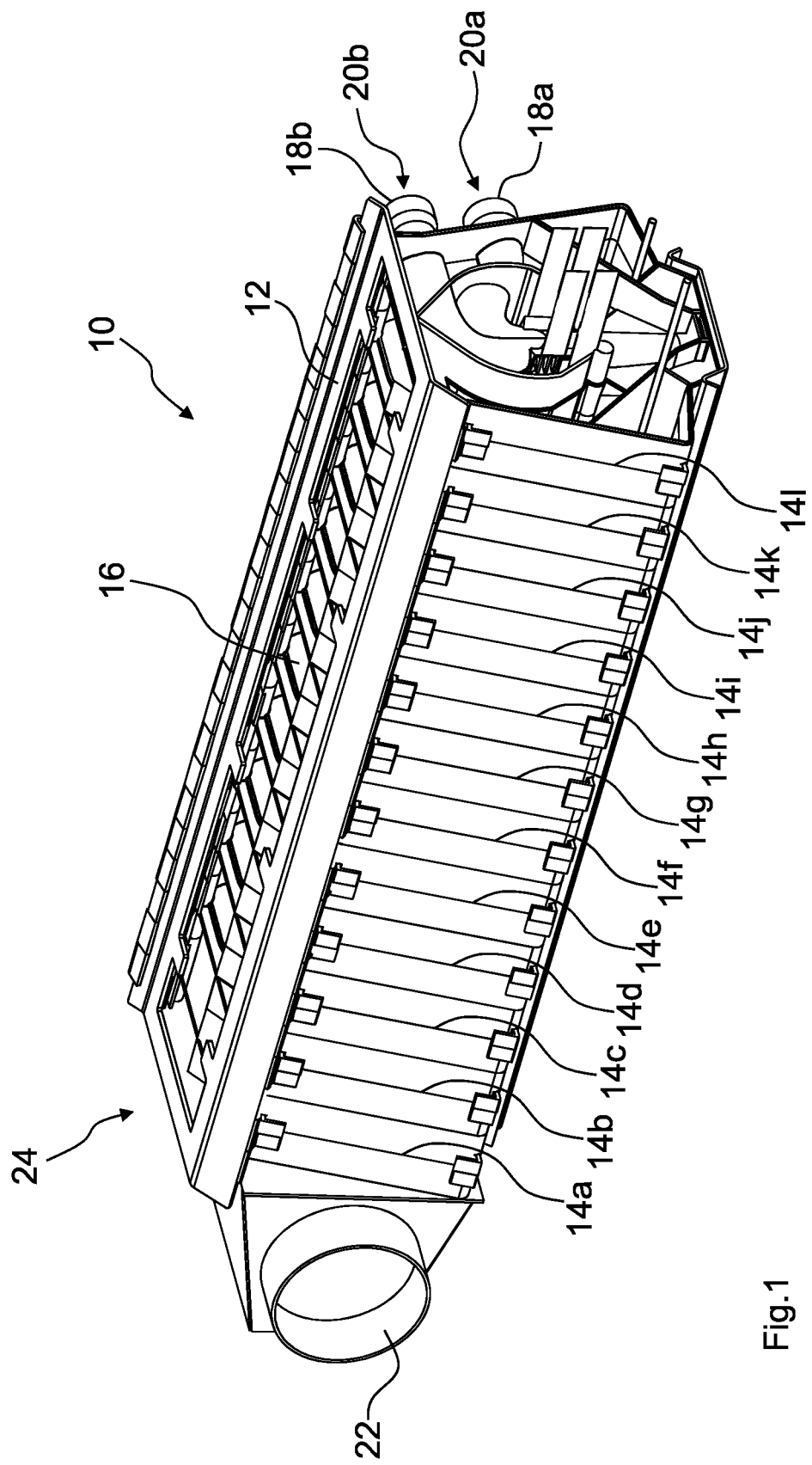
FIG. 1 shows an embodiment of the distribution device according to the invention in a perspective view.
Figure 2:
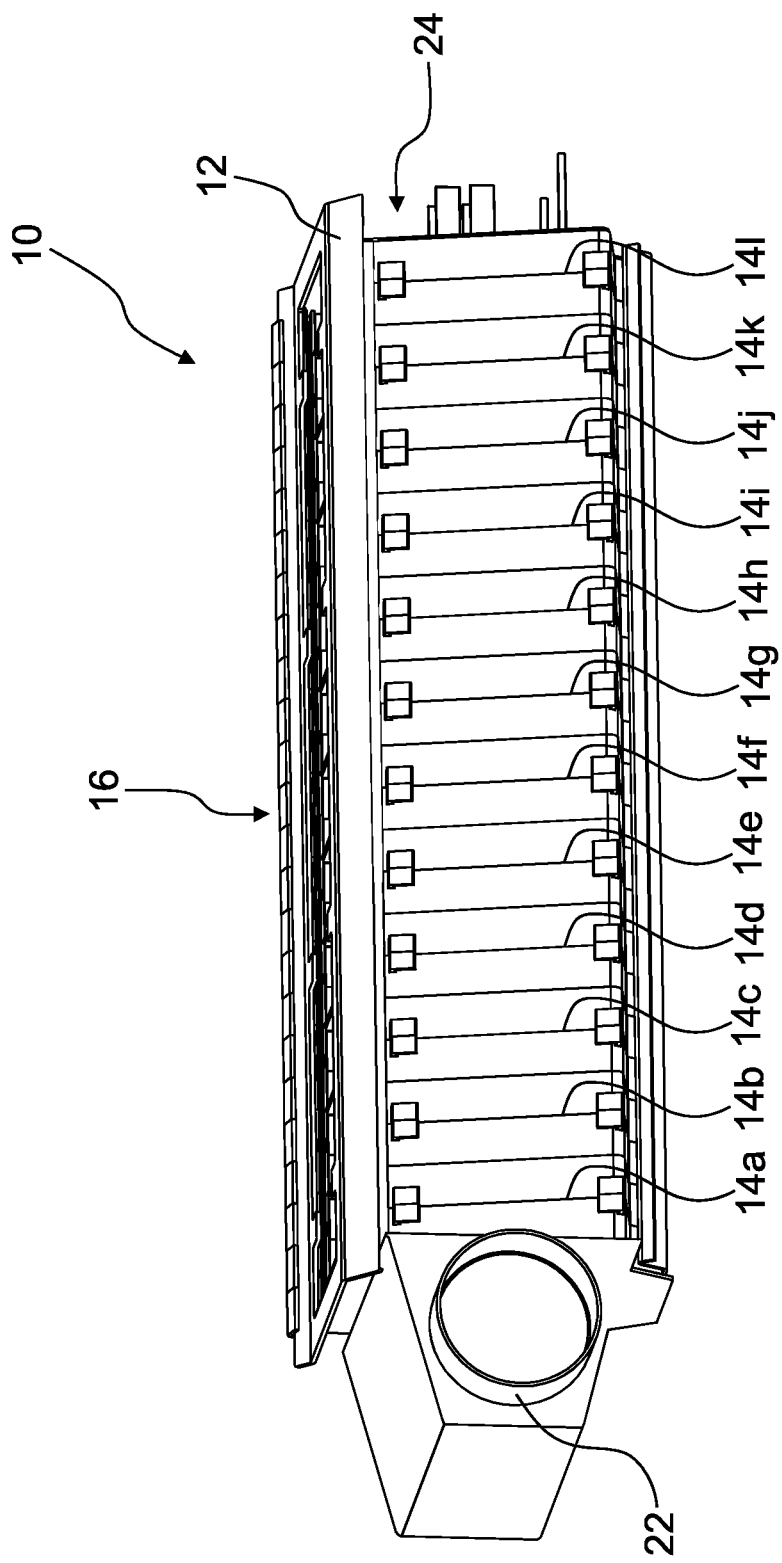
FIG. 2 shows the distribution device shown in FIG. 1 in a further perspective view.
Figure 3:
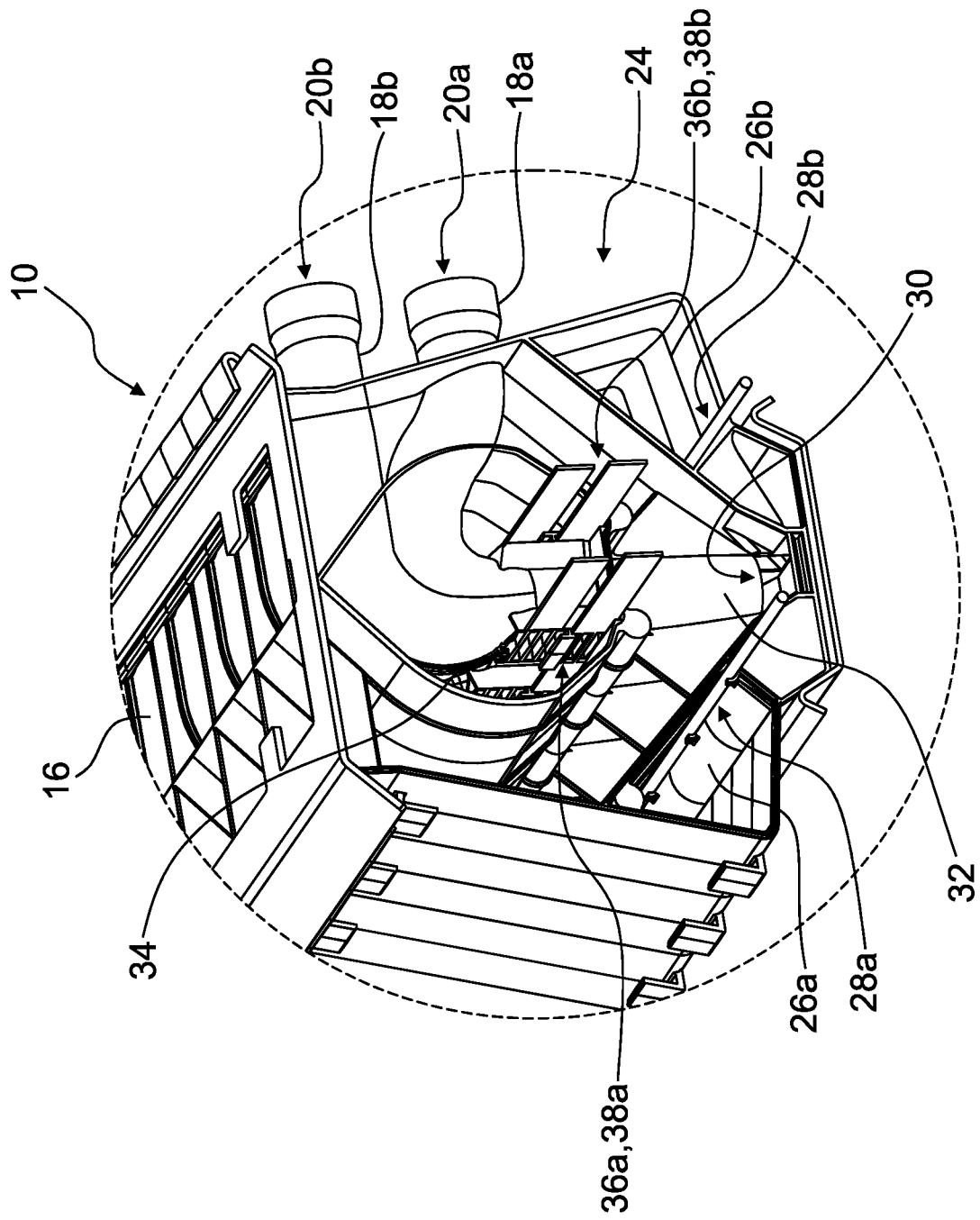
FIG. 3 shows the distribution device shown in FIG. 1 in a sectional view.
Figure 4:
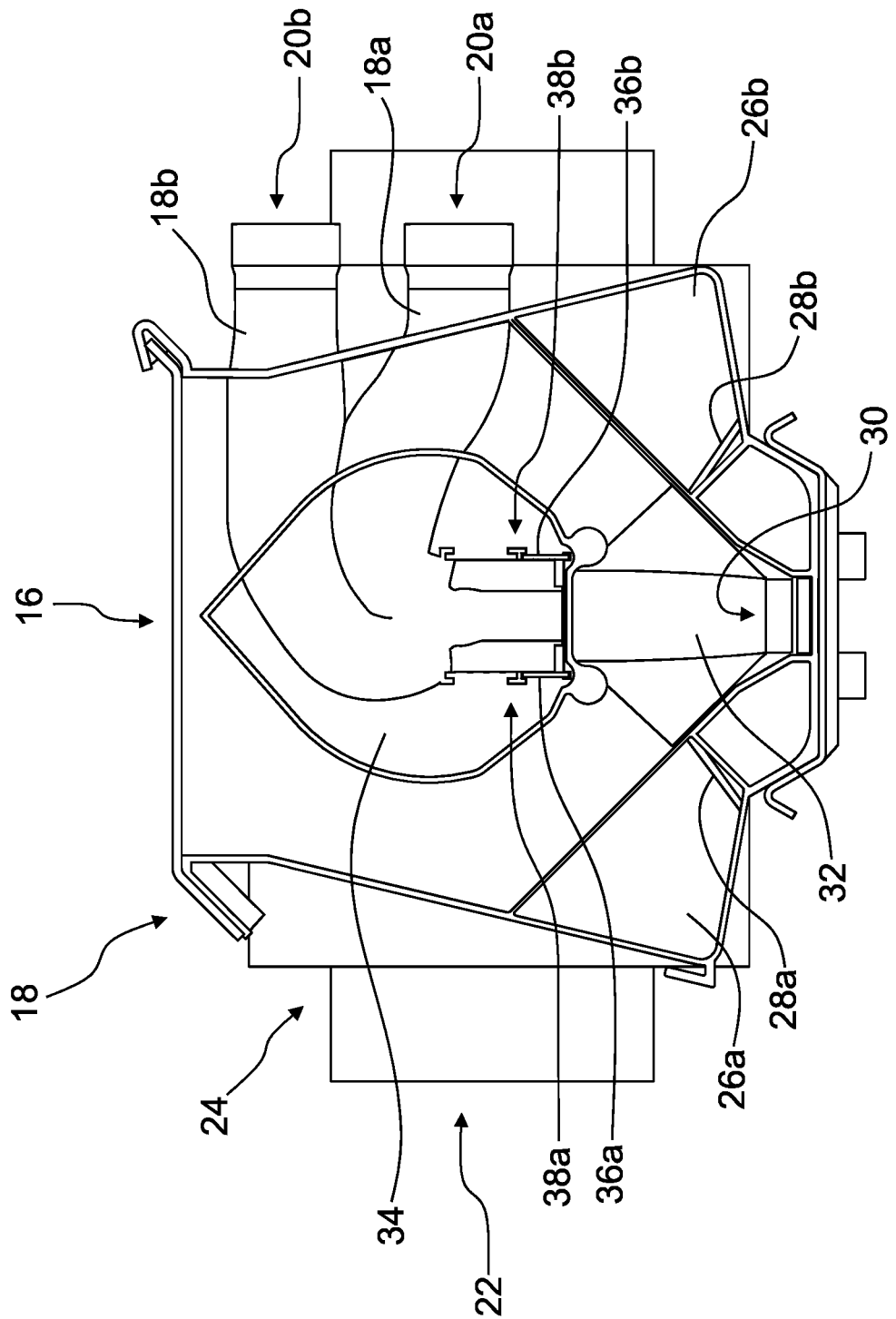
FIG. 4 shows the distribution device shown in FIG. 1 in a further sectional view.

FIGS. 1 to 4 show a distribution device 10 for seeds of an agricultural seed drill. The distribution device 10 has a plurality of distribution modules 14a-14l arranged side by side, which are inserted into a housing frame 12. The distribution modules 14a-14l can be non-destructively inserted into the housing frame 12 and non-destructively removed from the housing frame 12. Due to the modular structure of the distribution device 10, it is configured to be modularly scalable and can thus be adapted to different system sizes. Possible configurations of the distribution modules 14a-14l will be explained later with reference to FIGS. 5 to 9.

The distribution device 10 comprises a distributor housing 24, which has a material inlet opening 16 for the seed. The distribution device 10 is to be arranged below a seed storage container of the seed drill so that the distribution device 10 can function as a distribution lock between the seed storage container and the grain singling devices of the seed drill. The seed falls under the action of gravity through the material inlet opening 16 into the distributor housing 24.

The distributor housing 24 further has a main air inlet opening 22 through which an air flow can be introduced into the distributor housing 24. Within the distributor housing 24, a flow dividing device is arranged which divides the air flow introduced into the distributor housing 24 into material-free conveying air flows and a material-free additional air flow. Separate material-free air flows are thus generated within the distributor housing 24. For example, the flow dividing device may have one or more air deflecting surfaces positioned within the flow path of the air flow introduced into the distributor housing 24 via the main air inlet opening 22. Due to the common main air inlet opening 22, the conveying air flows and the additional air flow may be generated by the same blower. In an embodiment not shown, the distributor housing 24 includes two main air inlet openings 22 on opposite sides of each other.

A plurality of conveying air ducts 26a, 26b are arranged within the distributor housing 24 for guiding the material-free conveying air flows. Flow control devices 28a, 28b are arranged within the conveying air ducts 26a, 26b, by means of which the material-free conveying air flows can be adjusted. The flow control devices 28a, 28b in the conveying air ducts 26a, 26b each comprise a flap mechanism, which has a pivotable air metering flap. By changing the rotational angle position of the air metering flaps, the conveying air flows can be adjusted. The air metering flaps are connected to a flap shaft, and the rotational angle positions of the air metering flaps can be adjusted by rotating the flap shafts. Flow control is thus achieved by varying the flow cross-section within the conveying air ducts 26a, 26b.

The conveying air ducts 26a, 26b are connected within the distributor housing 24 to a grain-holding region 30. Within the grain-holding region 30, seed entering the distributor housing 24 through the material inlet opening 16 is introduced into the material-free conveying air flows. Material flow lines 32, 18a, 18b for the conveying air flows laden with the seed are connected to the grain-holding region 30. Via the material flow lines 32, 18a, 18b, the air flows laden with the seed can be conducted out of the distributor housing 24. The air flows laden with the seed can then leave the distribution device 10 via the material flow outlets 20a, 20b.

The material flow lines 32, 18a, 18b include one main conveying line 32 for each distribution module 14a-14l. The grain-holding region 30 arranged in the lower region of the distributor housing 24 is arranged below the respective main conveying lines 32. The main conveying lines 32 stand upright in the distributor housing 24 and serve to convey the conveying air flows laden with seed upwardly from the grain-holding region 30.

Furthermore, an additional air duct 34 for the material-free additional air flow is arranged within the distributor housing 24. The material-free additional air flow is introduced into the main conveying lines 32 via additional air inlets 38a, 38b. By means of the additional air flows, the main conveying lines 32 can be supplied with additional air so that the flow velocity and the seed are accelerated. In this way, a deposit of the granular material or even a clogging of the material flow lines 32, 18a, 18b is avoided. By means of the additional air flows, the material flow lines 32, 18a, 18b can also be kept free of residues adhering to the seed.

Flow control devices 36a, 36b are arranged at the additional air inlets 38a, 38b, by means of which the additional air flows can be adjusted. The flow control devices 36a, 36b at the additional air inlets 38a, 38b each comprise a slide mechanism which has a continuously displaceable air metering slide. By changing the position of the air metering slides, the additional air inlets 38a, 38b can be partially or completely covered so that the additional air flows can thereby be adjusted. The adjustment of the additional air flows is thus performed by changing the free flow cross-section in the region of the additional air inlets 38a, 38b.

The main conveying lines 32 are each divided into two material transport lines 18a, 18b downstream of the additional air inlets 38a, 38b. By means of the material transport lines 18a, 18b, the conveying air flows laden with seed can be guided out of the distributor housing 24. The material transport lines 18a, 18b can each have a quick-release fastener, to each of which a material transport tube can be connected without tools. The quick-release fasteners may be bayonet fasteners, for example.

The distribution device 10 may, for example, be connected to a plurality of supply units of the seed drill, each of which is adapted to collect seed from the conveying air flows laden with seed and to provide grain singling devices. The grain singling devices connected to the supply units then separate the grains of the seed and provide the singled grains to seed drill coulters, wherein the seed drill coulters place the singled grains onto an agricultural area.

The grain singling devices can be pneumatic or mechanical grain singling devices.

Figure 5:
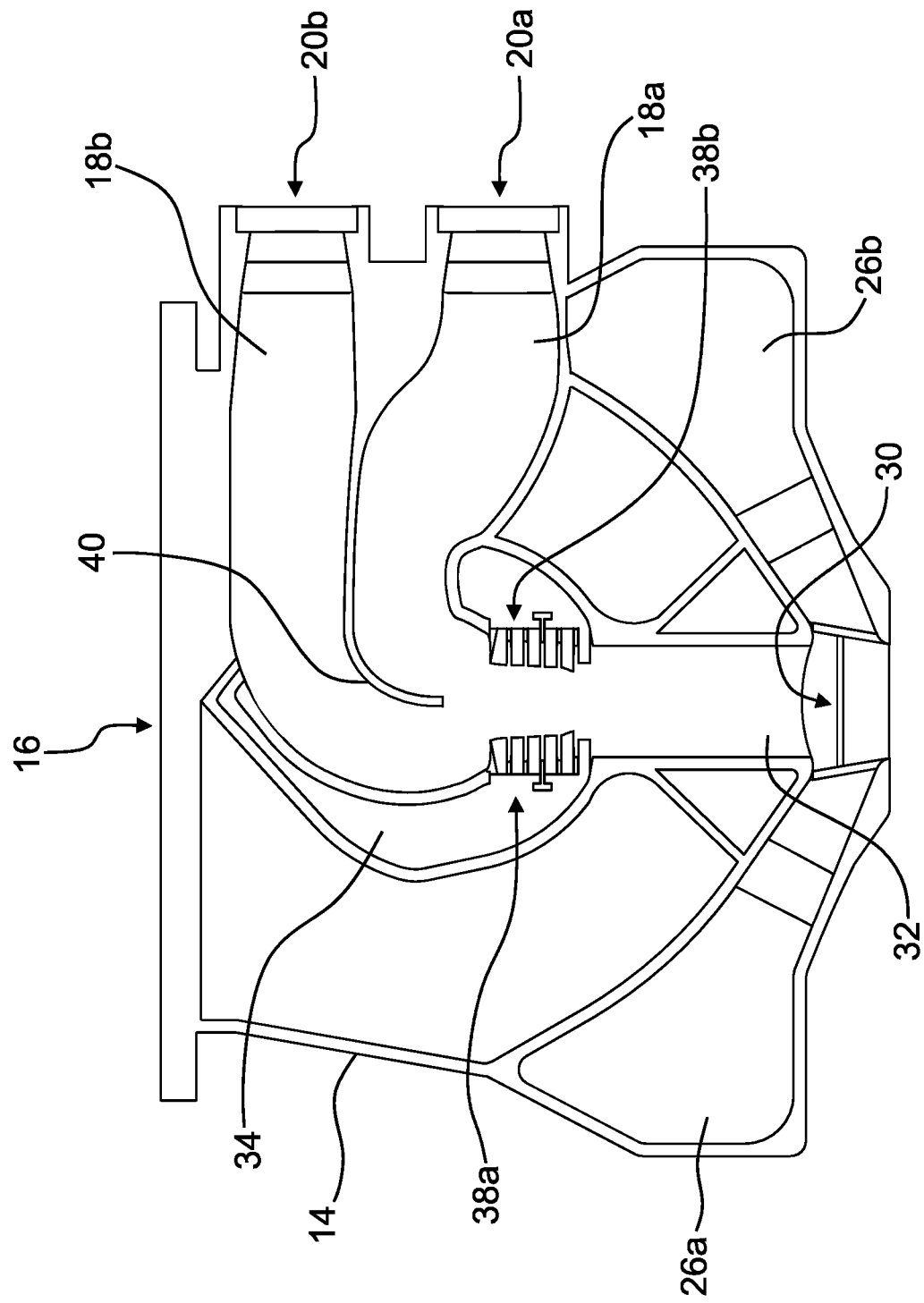
FIG. 5 shows a distribution module of a distribution device according to the invention in a side view.
Figure 6:
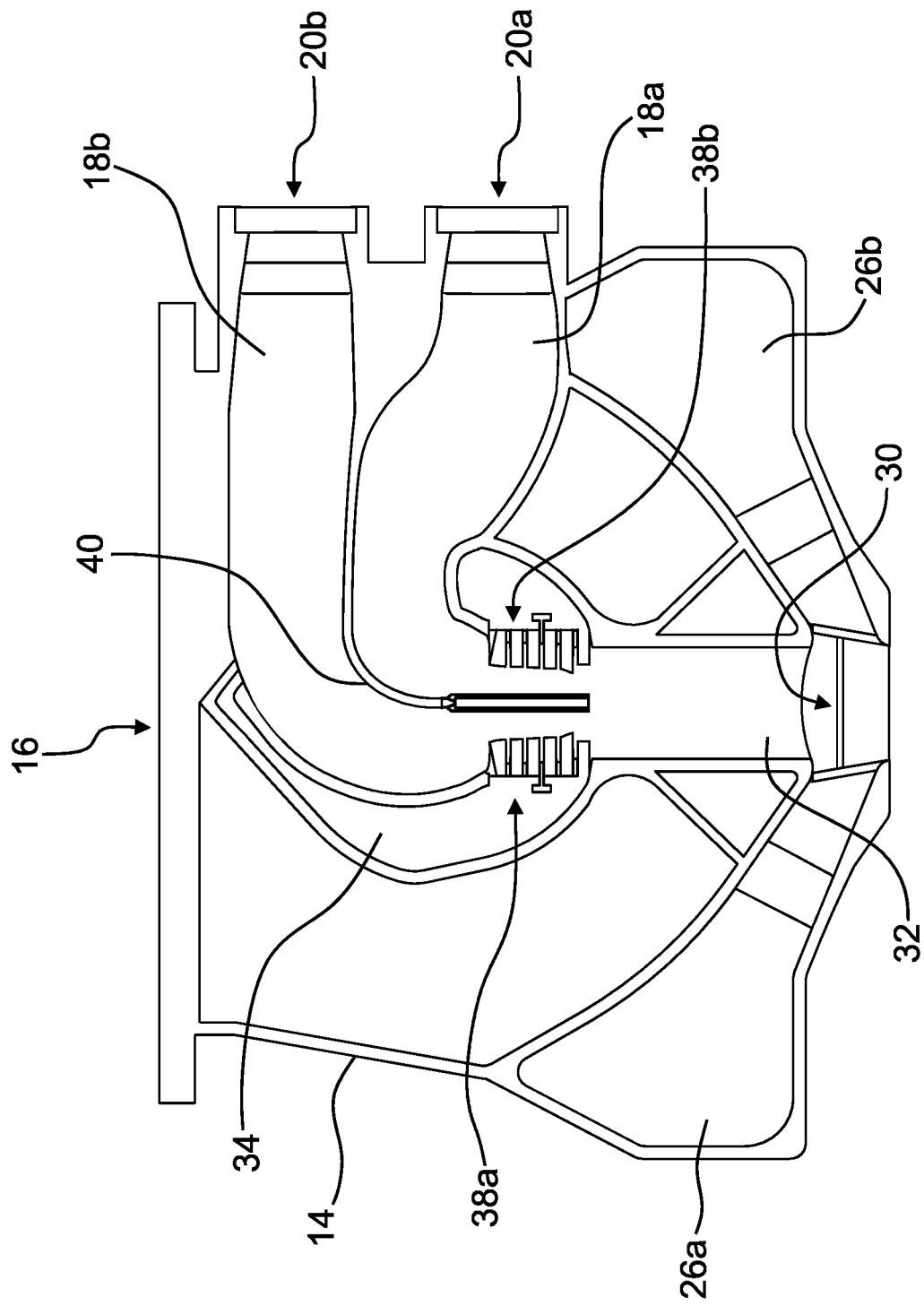
FIG. 6 shows a distribution module of a distribution device according to the invention in a side view.
Figure 7:
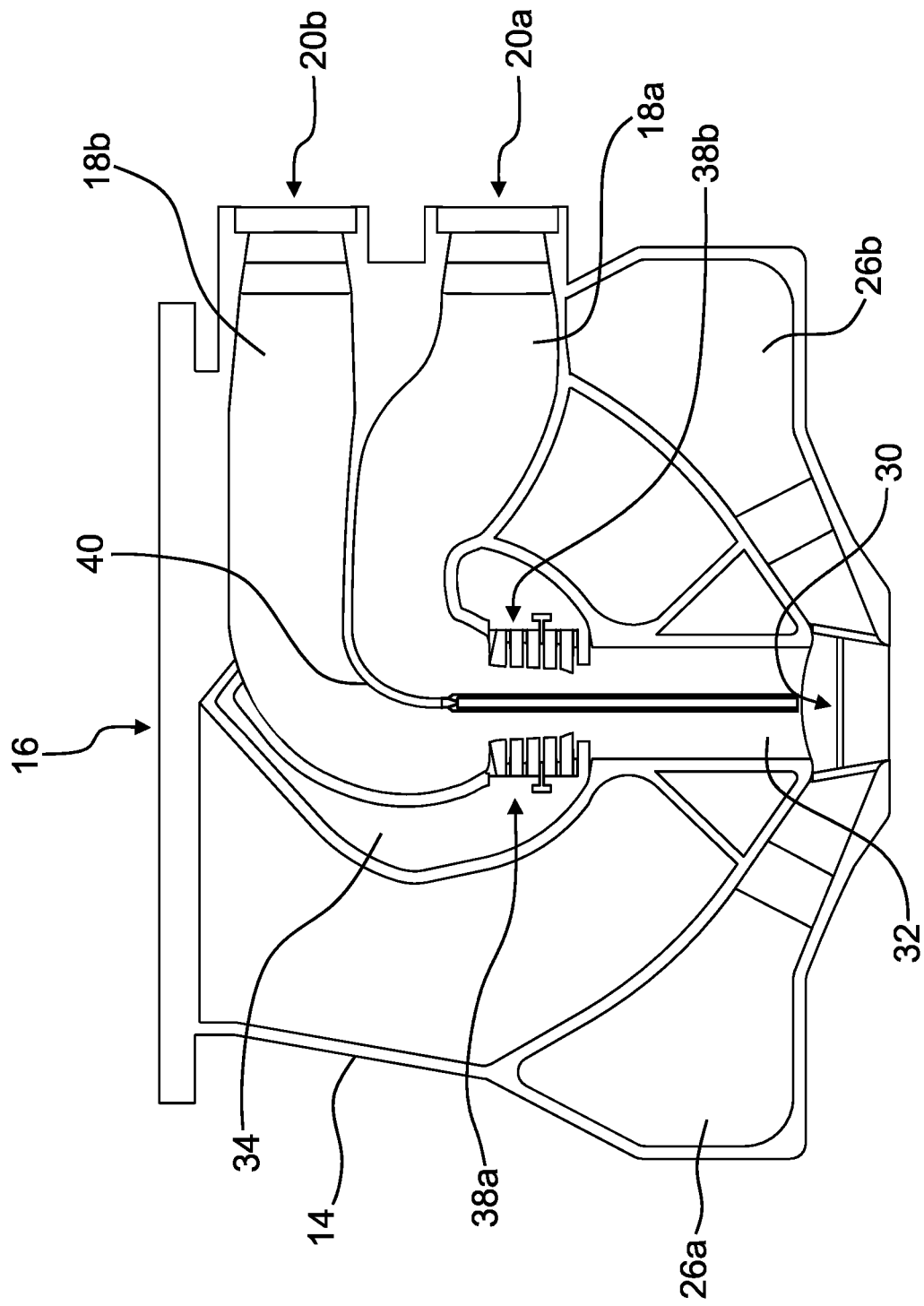
FIG. 7 shows a distribution module of a distribution device according to the invention in a side view.

FIGS. 5 to 7 each show a distribution module 14 of a distribution device 10. The distribution modules 14 each form a section of the material inlet opening 16 of the distribution device 10, via which seed can enter the distributor housing 24 of the distribution device 10. Furthermore, the respective distribution modules 14 comprise a grain-holding region 30, wherein the grain-holding region 30 is connected to two conveying air ducts 26a, 26b, respectively. In the respective distribution modules 14, a main conveying line 32 is connected to the grain-holding region 30, via which a conveying air flow laden with seed is directed upwards in the direction of the material conveying lines 18a, 18b.

The respective distribution modules 14 also each form a section of an additional air duct 34 which is connected to the main conveying line 32 via two opposing additional air inlets 38a, 38b.

In the main conveying lines 32 of each of the distribution modules 14 shown, a separating device 40 is arranged, which is adapted to create two separate flows within the main conveying line 32.

In the embodiment shown in FIG. 5, the separating device 14 is arranged downstream of the additional air inlets 38a, 38b so that two separate flows are generated only directly upstream of the material transport lines 18a, 18b.

In FIG. 6, the separating device 40 extends over the region of the additional air inlets 38a, 38b, however not up to the grain-holding region 30. In the flow direction downstream of the grain-holding region 30, a single conveying air flow laden with seed is thus initially formed, which is however divided into two separate flows by the separating device 40 upstream of the inlet area of the additional air flow.

In the embodiment shown in FIG. 7, the separating device 40 extends up to the grain-holding region 30 so that two separate flows are formed within the main conveying line 32 directly downstream of the grain-holding region 30.

Figure 8:
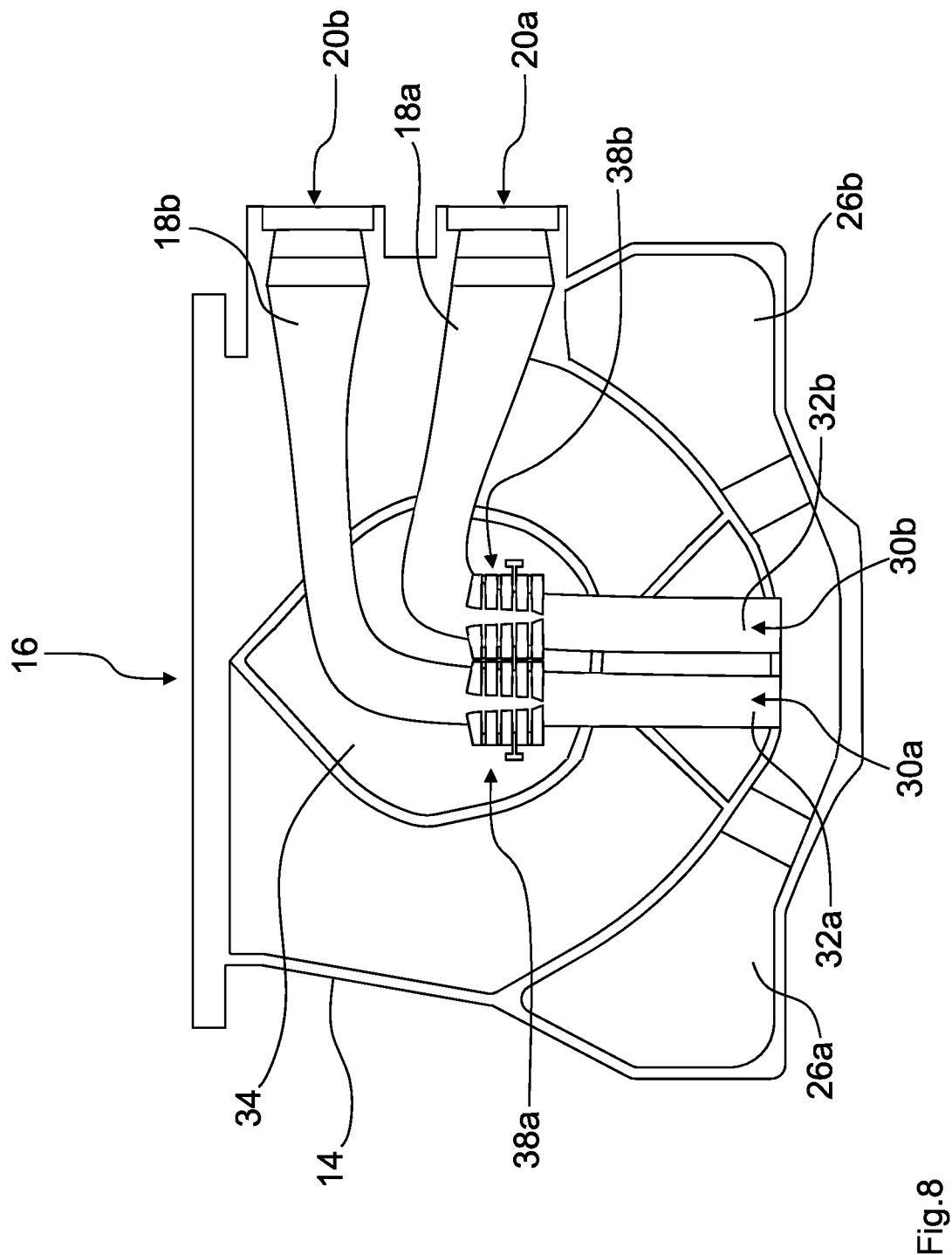
FIG. 8 shows a distribution module of a distribution device according to the invention in a side view.

FIG. 8 shows a distribution module 14, which has two main conveying lines 32a, 32b arranged side by side and spaced apart from each other, which connect directly to the grain-holding regions 30a, 30b located in the lower region of the distribution module 14. The two main conveying lines 32a, 32b merge in the flow direction downstream of the additional air inlets 38a, 38b into material transport lines 18a, 18b, via which the conveying air flows laden with seed are guided out of the distribution module 14.

Figure 9:
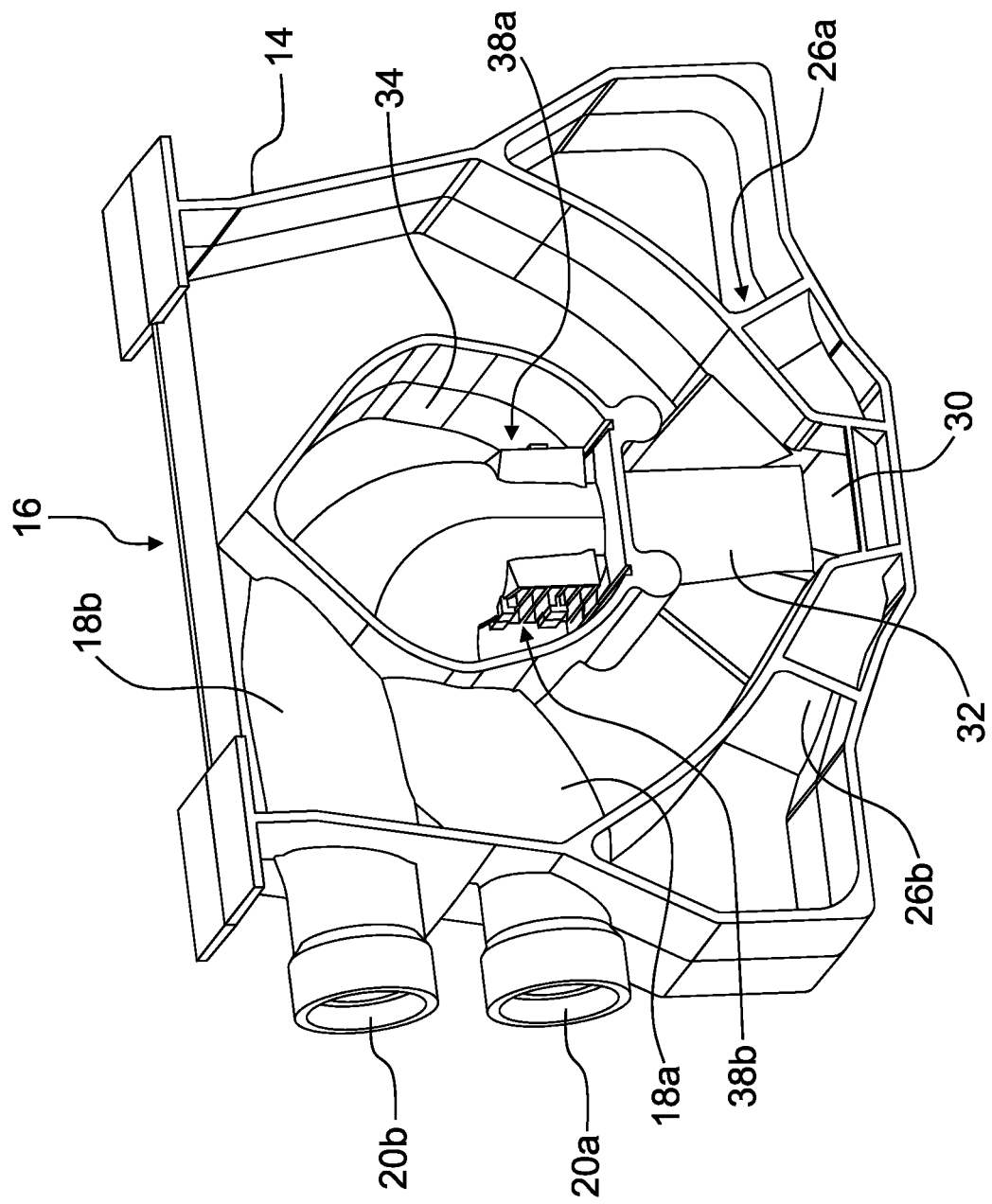
FIG. 9 shows a distribution module of a distribution device according to the invention in a perspective view.

FIG. 9 shows a distribution module 14 of a distribution device 10. The distribution module 14 is configured from two mirror-image halves. Further, the distribution module 14 has a mirror symmetrical outer contour such that the material flow outlets 20a, 20b can be arranged either on a first side of the distribution device 10 or on a second opposite side of the distribution device 10 depending on the alignment of the distribution module.

Figure 10:
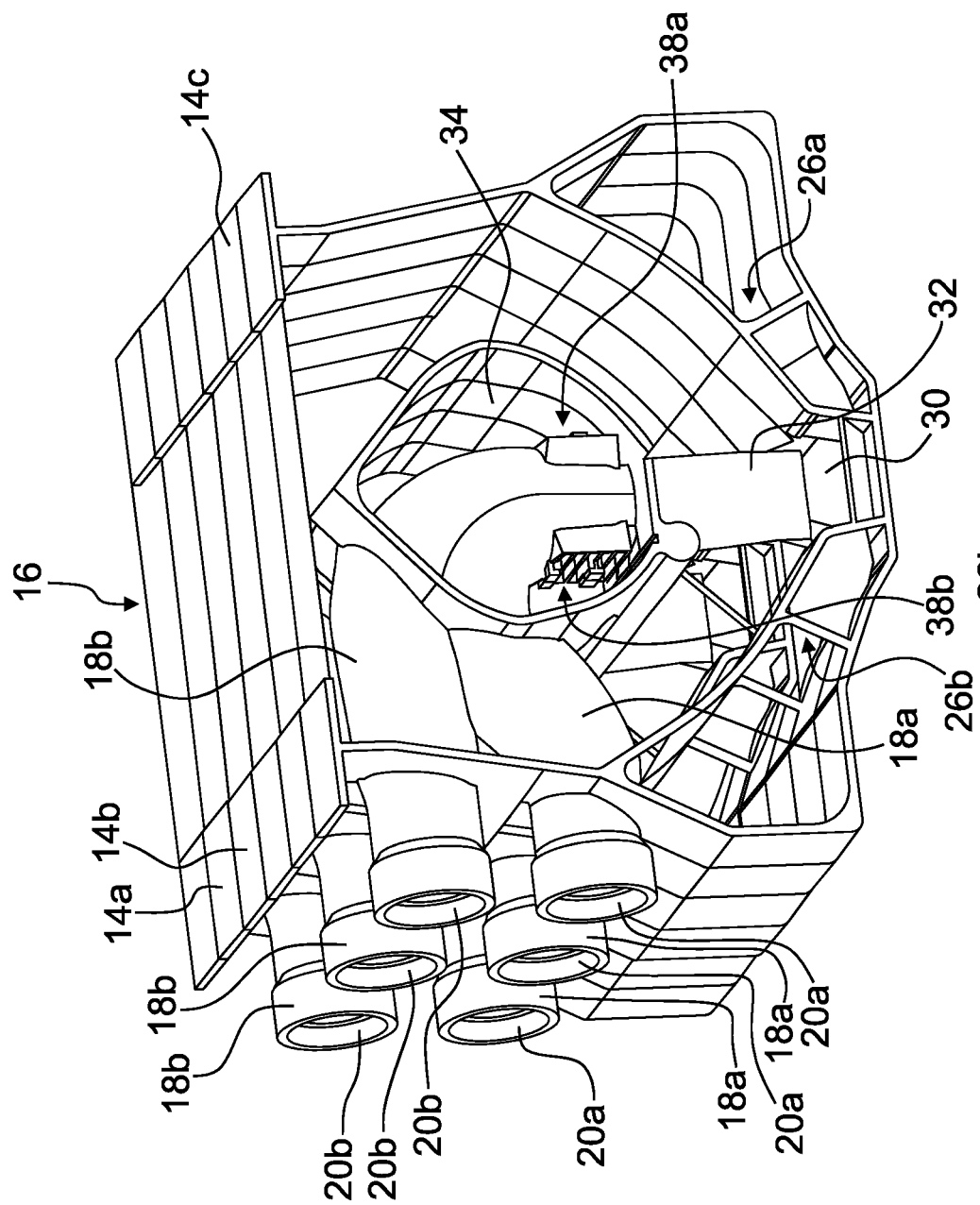
FIG. 10 shows several distribution modules of a distribution device according to the invention in a perspective view.

FIG. 10 shows several distribution modules 14a-14c arranged side by side, which can be inserted into a housing frame 12 of a distribution device 10. The number of available material flow outlets 20a, 20b can be determined by the number of distribution modules used. Thus, the distribution device 10 is configured to be modularly expandable and can thus be adapted to the system size of the seed drill.

LIST OF REFERENCE SIGNS

10 distribution device
12 housing frame
14, 14*a*-14*l* distribution modules
16 material inlet opening
18*a*, 18*b* material flow lines
20*a*, 20*b* material flow outlets
22 main air inlet opening
24 distributor housing
26*a*, 26*b* conveying air duct
28*a*, 28*b* flow control devices
30, 30*a*, 30*b* grain-holding regions
32, 32*a*, 32*b* material flow lines
34 additional air duct
36*a*, 36*b* flow control devices
38*a*, 38*b* additional air inlets
40 separating device

The invention claimed is:

1. A distribution device for granular material, comprising
a distributor housing having a material inlet opening for the granular material,
at least one conveying air duct arranged in the distributor housing for a material-free conveying air flow, wherein the conveying air duct is connected to a grain-holding region within the distributor housing, within which the granular material entering the distributor housing via the material inlet opening can be introduced into the material-free conveying air flow, and one or more material flow lines adjoining the grain-holding region for the conveying air flow laden with granular material;

wherein at least one additional air duct for a material-free additional air flow, which can be introduced via at least one additional air inlet into the one or more material flow lines, is arranged in the distributor housing, and wherein a flow control device is arranged in the at least one additional air duct or at the at least one additional air inlet, by which the additional air flow can be adjusted.

2. The distribution device according to claim 1, wherein the distributor housing has at least one main air inlet opening, via which an air flow can be introduced into the distributor housing, wherein a flow dividing device is arranged within the distributor housing, which is adapted to divide the air flow introduced into the distributor housing into the conveying air flow and the additional air flow.

3. Distribution device according to claim 1, characterized in that a flow control device is arranged in the at least one conveying air duct, by means of which the conveying air flow can be adjusted.

4. Distribution device according to claim 1 wherein, the one or more material flow lines comprise one or more main conveying lines, wherein the grain-holding region is preferably arranged in a lower region of the distributor housing and the one or more main conveying lines each extending upright in the distributor housing and each being arranged to convey a conveying air flow laden with granular material upwardly from the grain-holding region.

5. The distribution device according to claim 4, wherein at least one additional air inlet for introducing the additional air flow is located on the one main conveying line or on each of the plurality of main conveying lines.

6. The distribution device according to claim 1, wherein the one or more material flow lines comprise one or more material transport lines by means of which the conveying air flow or the conveying air flows laden with granular material can be guided out of the distributor housing.

7. The distribution device according to claim 6, wherein the one or more material transport lines each have a quick-release fastener by means of which a material transport tube can be connected to the respective material transport line, in particular without tools.

8. The distribution device according to claim 1, wherein the distribution device comprises a plurality of distribution modules arranged side by side, wherein the distribution device is modularly expandable via further distribution modules.

9. The distribution device according to claim 8, wherein each distribution module comprises at least one conveying air duct connected to a grain-holding region, one or more material flow lines adjoining the grain-holding region, and at least a portion of the additional air duct which is connected to the one or more material flow ducts via at least one additional air inlet.

10. The distribution device according to claim 8, wherein the distribution modules are inserted into a housing frame and are preferably non-destructively removable from the housing frame.

11. A seed drill, comprising a storage container for granular material, a distribution device adapted to introduce the granular material from the storage container into a plurality of conveying air flows;

several supply units, each of which is adapted to collect the granular material from a conveying air flow laden with granular material and to provide it to a grain singling device;

a plurality of grain singling devices, each connected to a supply unit and adapted to single grains from the granular material provided by the supply unit; and several seed drill coulters for placing singled grains on an agricultural area;

wherein the distribution device is configured according to claim 1.

* * * * *